United States Patent
De Lima (12)

(10) Patent No.: US 6,450,638 B1
(45) Date of Patent: Sep. 17, 2002

(54) APPARATUS FOR PIVOTABLY ATTACHING CORRECTIVE LENSES TO PROTECTIVE SPORTIVE GLASSES

(76) Inventor: Luiz Carlos De Lima, Rus Gibralter, 10 Santo Amaro, Sao Paulo (BR)

( * ) Notice: Subject to any disclaimer, the term of this patent is extended or adjusted under 35 U.S.C. 154(b) by 0 days.

(21) Appl. No.: 09/633,912

(22) Filed: Aug. 8, 2000

(51) Int. Cl.$^7$ ................................. G02C 7/08

(52) U.S. Cl. ......................... 351/57; 351/58

(58) Field of Search .............. 351/47, 57, 48, 351/58

(56) References Cited

U.S. PATENT DOCUMENTS

| | | | |
|---|---|---|---|
| D199,334 S | * 10/1964 | Magnuson et al. | D16/316 |
| 5,007,727 A | * 4/1991 | Kahaney et al. | 351/47 |
| 5,907,384 A | * 5/1999 | Kirsch et al. | 351/48 |
| 6,099,120 A | 8/2000 | De Lima | 351/153 |

OTHER PUBLICATIONS

"Caribe, O'Unico Oculos Totalmente Reapproveitavel", brochure, published Jan. 1996 (with 2 page English translation).

"Carbie, Seguranca Para Seus Olhos", published Jan. 1996 (with 4 page English translation).

* cited by examiner

*Primary Examiner*—Huy Mai
(74) *Attorney, Agent, or Firm*—Merchant & Gould P.C.

(57) ABSTRACT

"SUPPORT FOR INDEPENDENT CORRECTIVE LENSES, APPLIED TO PROTECTIVE AND/OR SPORT GLASSES", wherein a fixed or hinged device on the corrective lenses support allows them to be overlapped on the back side of a protective or sport lens; the system, in its hinged version, allows lenses to be simultaneously tilted or hinged upwards, so that the external (protective) lens and the internal (corrective) lens may be easily cleaned, aiming at providing greater convenience and practicality to those who need to continuously wear glasses or corrective lenses to correct vision and also protective glasses at the same time. It comprises a pair of protective glasses (1), with a frame (A) and a protective lens (L) having a projecting outline (2) on the back portion, the corrective assembly consisting of a pair of lenses (3) with a variable shape, mounted on a metallic semicircular frame (4) having semicircles interconnected by a U-shaped support (5); U-shaped clamps (6), which are attached to the edge of lens (L), may be provided with ducts (7) to which the oblique ends of support (5) are attached, thus allowing the assembly to be tilted; said clamps (6) are provided with cylindrical hinges (8), an internal spring and shafts (9), its lower portion being in contact with bar (5') and to frame (4).

12 Claims, 5 Drawing Sheets

FIG.10A

APPARATUS FOR PIVOTABLY ATTACHING CORRECTIVE LENSES TO PROTECTIVE SPORTIVE GLASSES

FIELD OF THE INVENTION

The present invention relates generally to glasses, and more particularly to a system for attaching corrective lenses to protective or sport glasses.

BACKGROUND OF THE INVENTION

The present patent comprises a functional system wherein a pair of corrective lenses (according to the individual's need) are directly and quickly attached to the inner portion of protective and/or sport glasses.

The above mentioned system includes a device comprising a support for the corrective lenses, said support having a variable construction, that is, it may be fixed or hinged; in this latter case, the corrective lenses may be simultaneously tilted or hinged upwards, so that the back portion of the external (protective) lens (which is close to the user's face), as well as both surfaces of the corrective lens, may be easily cleaned, aiming at providing greater convenience and practicality to those who need to continuously wear glasses or corrective lenses to correct vision and also protective glasses at the same time. Therefore, such system provides a greater practicality to those who must wear corrective lenses directly attached to protective glasses at the same time.

The purpose of constructing a fixed or tilting support is due to the availability of variants of this product in market, said product having a lower final price.

In the fixed support model for corrective lenses, it has to be completely removed from the supporting lens so that the assembly may be cleaned. In turn, the alternative system, comprising the hinging or tilting device, does not require the corrective lenses assembly to be removed for cleaning, that is, the user simply has to tilt the corrective lenses upwards, have them cleaned and then return the assembly downwards; by doing so, the glasses are ready for use again.

To prevent the corrective lenses support from moving inadvertently, the pivoting or hinging system provides a locking device in order to keep said support in the vertical position (usage position) or horizontal position (cleaning position).

It is noted, thus, that individuals who routinely and compulsorily need to wear glasses with corrective lenses for work or sport purposes, as well as protective glasses or protection, will significantly benefit from this practical system of lenses and protective glasses, advantageously counting on an easy-to-clean device which offers greater practicality when mounting and using corrective lenses.

As the corrective lens support is not required to be disassembled from the protective or sport lens, the assembly is always aligned and does not impair the optical aspect. This is a difference between the fixed and tilting systems.

In addition to the numerous advantages mentioned above, the present system also has an esthetic design resulting in excellent look.

SUMMARY OF THE INVENTION

The present combination system of protective glasses with fixed or tilting corrective lenses is provided attached and/or also as a kit containing other kinds of protective lenses (colorless protective lenses, filters, amber, blue, fumé, etc.); the user simply has to remove the corrective lenses and attach them to these other protective lenses contained in the kit.

Therefore, it is worthy emphasizing the following aspects:

a) ergonomics, as tests proved that this system is highly functional, since the protective/corrective glasses assembly has its total weight reduced and, as a result, it is more conformable;

b) greater protection, since lenses remain firm and stable;

c) reduced cost, since parts can be standardized and supplied as a kit or separately;

d) esthetics, as the lenses interchange/combination system does not require adaptations;

e) easy cleaning, thus preventing user from remaining without glasses for too long.

In view of all these significant improvements, the device proposed has all the conditions required to reach the privilege now claimed.

BRIEF DESCRIPTION OF THE DRAWINGS

So that this system may be easily understood, reference will be made to the attached drawings, in which.

DETAILED DESCRIPTION

An embodiment of the claimed invention according to the scope shown in the attached drawings, consists of a pair of protective glasses, comprising its frame (A) and the protective lens (1) made of appropriate materials for this purpose.

Figure 1:
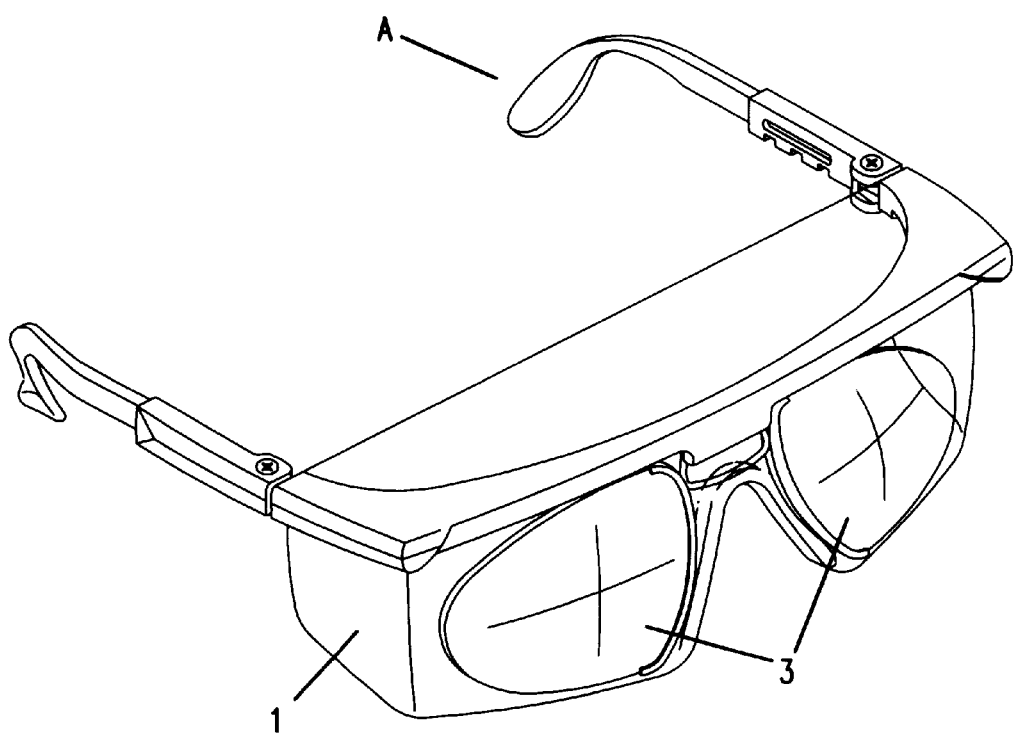
FIG. 1 shows a pair of protective glasses provided with the fixed system and using a certain support model for corrective lenses.
Figure 2:
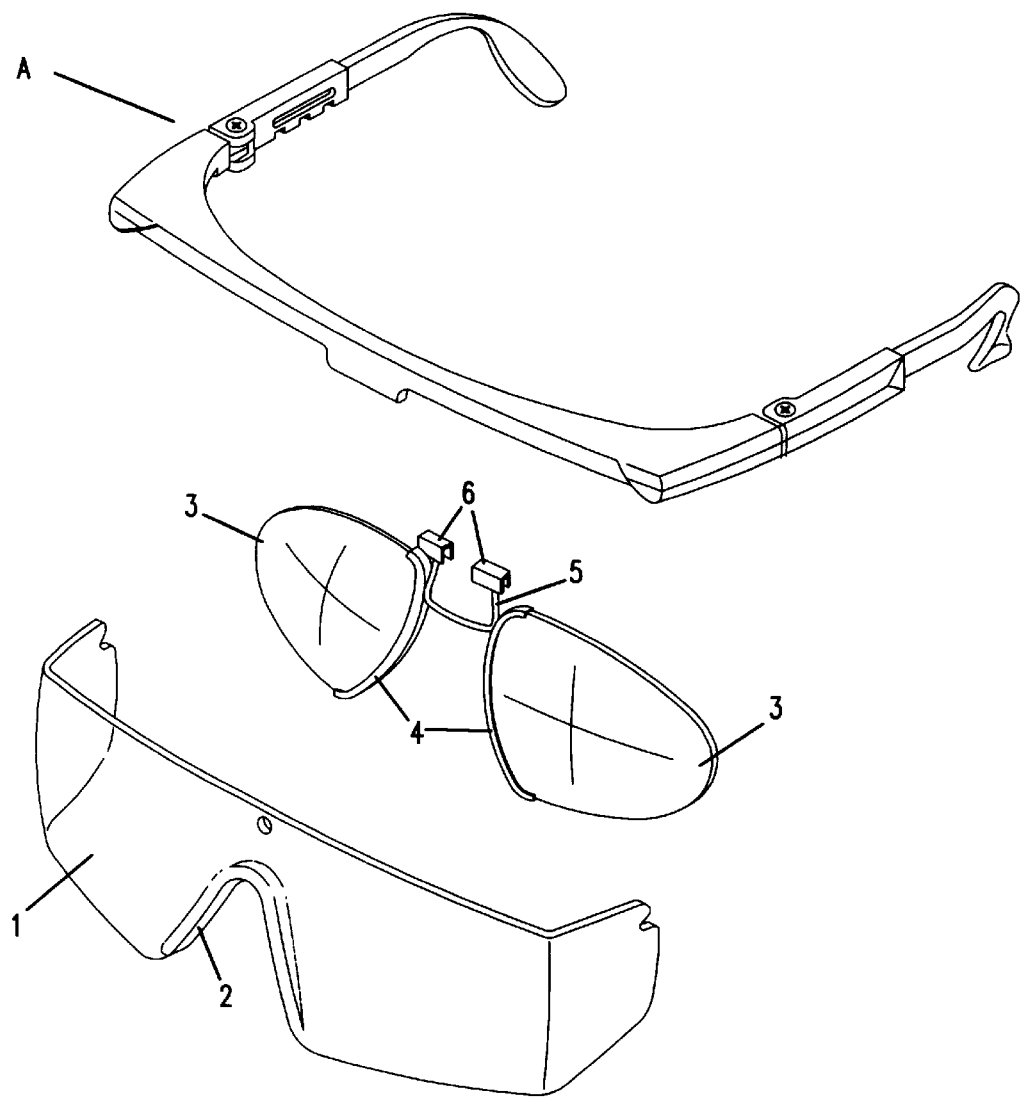
FIG. 2 shows an exploded view of the assembly of FIG. 1.
Figure 3:
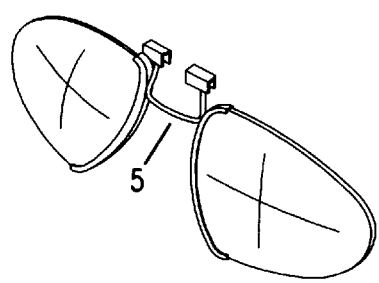
FIGS. 3, 3A, 4, 5, 5A, and 6 show the front and back portions of the corrective lenses and the manner in which they are attached to the protective lens, with the respective figures illustrating different embodiments.
Figure 3A:
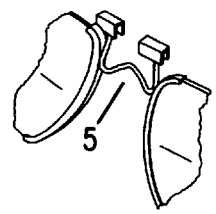
Figure 4:
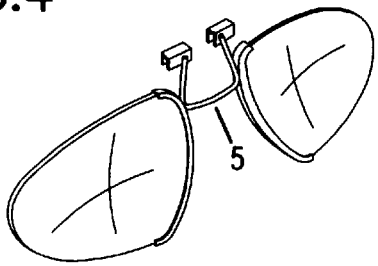
Figure 5:
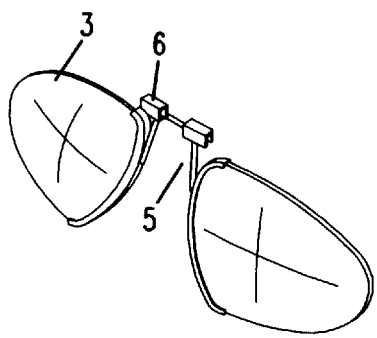
Figure 5A:
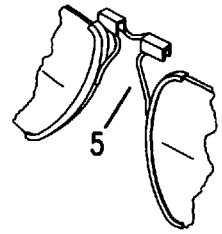
Figure 6:
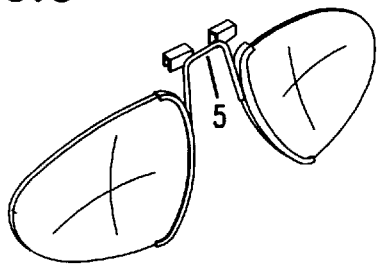

FIG. 1 shows a pair of protective glasses provided with the fixed system and using a certain style or model of corrective lenses. FIG. 2 shows an exploded view of the assembly of FIG. 1. Said lens (1) is in contact with (or integral to) a projecting outline (2) which in use rests on the user's nose, said outline projecting backwards from the lens.

The corrective assembly consists of a pair of lenses (3) having a variable shape, mounted on the metallic semicircular frame (4). As used herein, the term semicircular includes not only semicircular shapes, but also ovals, arcs and other curves and portions thereof. Semicircles of this frame are interconnected by an essentially U-shape spring-effect support (5); the design of the support may be varied as shown by the various embodiments shown in FIGS. 3, 3A, 4, 5, 5A 6, 9 and 9A. The design may be changed to assure that the semicircles of frame (4) are supported firmly against outline (2) of lens (1) in use. This is possible since support (5) creates a different tension "K" according to its position (e.g., with tips turned downwards or upwards).

Figure 7:
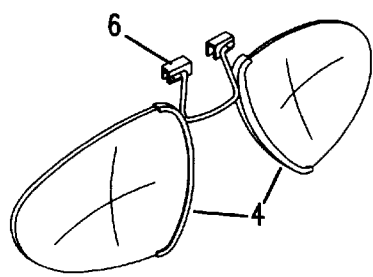
FIGS. 7 and 7A show the back portion of the corrective lenses support, where the tilting/hinging devic can be seen; and, FIG. 7B shows knurls (4')
Figure 7A:
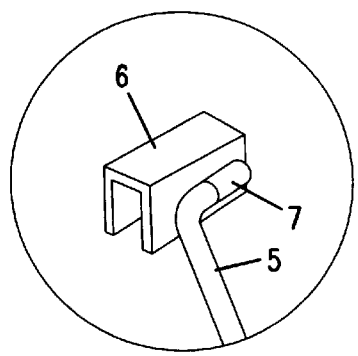
Figure 7B:
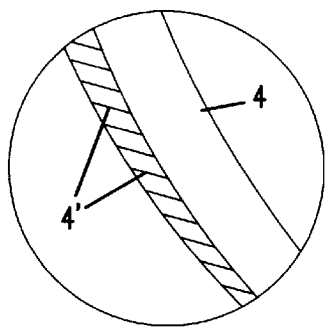
FIG. 7C shows rubber coatings (4") provided on the external bend of frame (4).
Figure 7C:
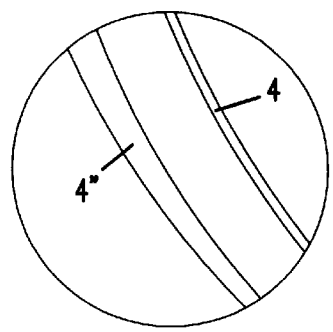

Rubber coatings (4") or knurls (4') are also provided on the external bend of frame (4) semicircles in order to further assure a steady support on outline (2), as shown in FIGS. 7B and 7C.

U-shaped clamps (6) are provided in contact with the front of support (5), respectively in their upper portion, so as to be attached to the edge of lens (1), thus completing the assembly.

In the embodiment shown in FIGS. 7 and 7A, the U-shaped clamps (6), which are preferably attached to the top edge of lens (1), includes ducts (7) (e.g., a receiving member). The oblique ends of support (5) are pivotably engaged by ducts (7), so as to allow the assembly tilting.

In this version of support (5) having a tilting feature, it is worthy noticing that said support (5) does not rest on the projecting outline (2), since lenses are kept lowered due to the spring effect occurring at the L-shaped ends of support (5) in ducts (7) of clamps (6).

Figure 8:
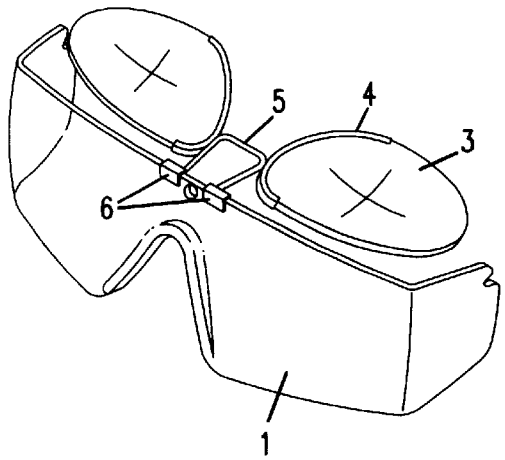
FIG. 8 shows the corrective lenses assembly, tilted relative to the protective lens in order to facilitate cleaning.
Figure 9:
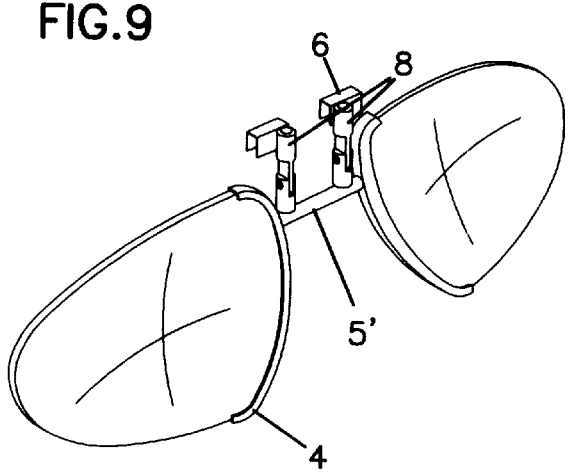
FIG. 9 and its detail FIG. 9A show the back portion of the corrective lens with another variant of the hinging device.
Figure 9A:
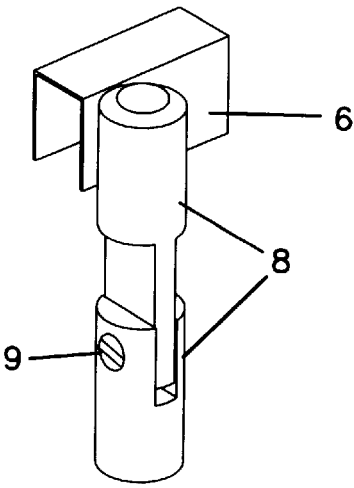
Figure 10:
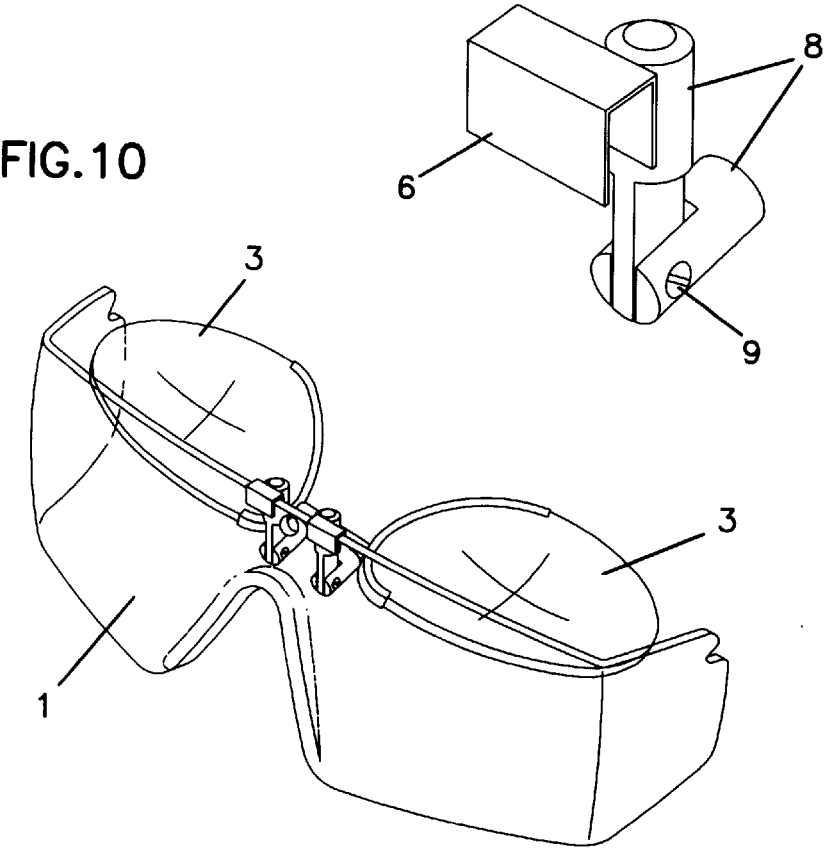
FIG. 10 and its detail FIG. 10A show the assembly of FIG. 9 being hinged and attached to the main protective lens.

FIGS. 7 and 7A show the back portion of the corrective lenses support, where the tilting/hinging device can be seen. FIG. 8 shows the corrective lenses assembly, tilted relative to the protective lens in order to facilitate cleaning.

According to FIGS. 9, 9A, 10 and 10A, clamps (6) may be provided with cylindrical hinges (8), having an internal spring to keep them aligned downwards or at 90°, said hinges being provided with shafts (9), its lower portion being in contact with bar (5') and to frame (4).

What is claimed is:

1. Apparatus for pivotably attaching corrective lenses to protective glasses, comprising:
   a) a pair of protective glasses comprising a frame and a protective lens in contact with said frame; and
   b) a corrective assembly comprising a pair of corrective lenses each mounted on a substantially semicircular frame;
   c) a support which is arranged and configured to interconnect said semicircular frames, said support including clamps for connecting to a top of said protective lens, said clamps being pivotably connected to said support such that said corrective assembly is pivotable with respect to said protective glasses.

2. The apparatus according to claim 1, wherein:
   a) said protective lens further includes a backwards projecting outline;
   b) said semicircular frames are arranged and configured to engage said outline in a first position; and
   c) said support is constructed in a manner to provide a spring effect force to said semicircular frames against said outline when said corrective assembly are in said first position, whereby the corrective lens assembly is retained in said first position.

3. The apparatus according to claim 2, wherein said support is not in direct contact said outline.

4. The apparatus according to claim 2, wherein said support includes ends, said ends being turned upwards.

5. The apparatus according to claim 2, wherein said support includes ends, said ends being turned downwards.

6. The apparatus according to claim 2, wherein said clamps comprise cylindrical hinges connected to said spring-effect support so as to enable said corrective assembly to be pivotable with respect to said protective glasses, and cylindrical hinges comprising an internal spring and pivot shaft therein.

7. The apparatus according to claim 1, wherein said clamps include ducts and said support includes distal ends, said ducts being adapted to pivotably accept said distal ends of said support therein so as to enable said corrective assembly to be pivotable with respect to said protective glasses.

8. The apparatus according to claim 1, further comprising a rubber coating on at least an external bend of said semicircular frames.

9. The apparatus according to claim 1, further comprising knurls on at least an external bend of said semicircular frames.

10. The apparatus according to claim 1, wherein said corrective assembly is pivotable with respect to said protective glasses between a first usage position and a second cleaning position.

11. The apparatus according to claim 10, wherein said first usage position of said corrective assembly is substantially vertical.

12. The apparatus according to claim 10, wherein said second cleaning position of said corrective assembly is substantially horizontal.

* * * * *